United States Patent

[11] 3,587,963

| [72] | Inventors | John W. Meulendyk; Robert D. Vanderlaan, Kalamazoo, Mich. |
|---|---|---|
| [21] | Appl. No. | 804,831 |
| [22] | Filed | Mar. 6, 1969 |
| [45] | Patented | June 28, 1971 |
| [73] | Assignee | Pneumo Dynamics Corporation Cleveland, Ohio |

[54] COMBINATION BYPASS AND RELIEF VALVE
14 Claims, 6 Drawing Figs.

[52] U.S. Cl. .................................................. 236/92,
137/468, 137/495
[51] Int. Cl. .................................................. G05d 23/02
[50] Field of Search ............................................. 137/468,
495, 529, 530, 505.42; 230/92, 92 (C), 92 (CX),
93

[56] References Cited
UNITED STATES PATENTS

| 2,099,643 | 11/1927 | Werring | 236/92 |
| 2,764,996 | 10/1956 | Brown | 137/505.42X |
| 2,944,564 | 7/1960 | Pettey | 137/529 |
| 3,254,666 | 6/1966 | Baker | 137/468X |
| 3,403,854 | 10/1968 | Rutledge | 236/92 |

*Primary Examiner*—Harold W. Weakley
*Attorney*—Stephen M. Mihaly

ABSTRACT: A combination valve parallels a hydraulic servovalve in an actuator system, the combination valve including a single valve seat and cooperable poppet. The poppet is intermediately loaded through a bimetallic member below a certain temperature to provide restricted flow serving to heat the system fluid to a desired operating temperature at which the bimetal is actuated to free the poppet for bypass flow. A solenoid is actuatable to load the poppet against the seat by a pressure-regulating spring to provide closure to a predetermined relief pressure.

INVENTORS
JOHN W. MEULENDYK
ROBERT D. VANDERLAAN

BY

ATTORNEY

INVENTORS
JOHN W. MEULENDYK
ROBERT D. VANDERLAAN

COMBINATION BYPASS AND RELIEF VALVE

This invention relates to a valve assembly which will, as indicated, have both bypass and relief modes of operation.

Such valving has, for example, been employed in open loop hydraulic actuator systems containing electrohydraulic servo valves to provide either unrestricted flow of the hydraulic fluid around the servovalve, in the bypass mode, or restricted flow to a predetermined relief pressure level, in a relief mode established by a system actuation signal. Separate valves have, however, been employed for the separate modes, and it is a primary object of the present invention to provide an assembly in which the two modes are realized with a single valve seating member, thereby obviously simplifying the system, improving the reliability with fewer critical parts, and eliminating one potential leakage path.

It is another object of the invention to provide such a combination valve which is temperature sensitive and, when the temperature is relatively low, automatically experiences a third heating mode in which the hydraulic fluid is heated to a more suitable operating temperature. This temperature addition is extremely beneficial in actuator systems which may be subjected to cold temperatures, for example, within the range of from −65°to +50°F, since the high fluid viscosity which results causes the system to respond slowly and experience drastic changes in pressure gain and null position shifting.

The indicated temperature responsiveness of the new valve is, moreover, provided in such manner as to protect the system from overheating.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
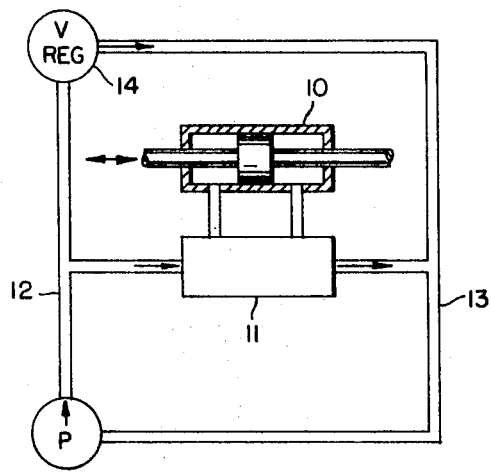
FIG. 1 is a schematic of a typical system including a valve in accordance with the present invention.

Referring now to the drawings in detail, the system schematically illustrated in FIG. 1 comprises an actuator 10 under control of an electrohydraulic servovalve 11 of conventional design. The hydraulic fluid is delivered to such valve by a pump P through a supply line 12 and returned through the return line 13. The new combination bypass and relief valve 14 parallels the servovalve in the system and, as shown in the remaining figures, comprises a body 15 having an inlet 16 connected to the pressure fluid supply line and outlet 17 connected to the return line of the system. As previously noted, the combination valve is adjusted to its relief condition in response to an actuation signal which may, most simply, be manual, but in the illustrated embodiment is operative to actuate a solenoid 18 to extend the plunger 19 of the same as will be more fully described below.

At the inlet side, the valve has a relatively reduced passage 20 leading to a valve seat 21 the opening and closing of which is controlled by a poppet 22. In the vertical orientation shown, the poppet extends through the relatively enlarged chamber 23 above the seat and reciprocably through an intermediate wall section 24 to a still further enlarged stepped recess in the body having a smaller lower section 25, an intermediate section 26 of both larger diameter and height, and an upper further enlarged diametrically but relatively shallow section 27 at the body top face. The solenoid structure is applied against the body top with a recess 28 complementing the upper section 27 of the body as shown and housing the head of the normally retracted plunger.

A passage 30 leads from the valve seat chamber to the upper section of the main body chamber or recess, and the latter is suitably ported as shown at 31 for the outflow of the fluid to the system return line. Within the lower section 25 of the body recess, the poppet carries a collar 32 for damping the poppet movement and isolating the same from vibration in the device. The upper end of the poppet, which is a rod form, extends slidably through a piston 33 in the main recess section 26 having a depending skirt 34 in engagement with the wall of the same. For a purpose to be described, the freedom of movement of the poppet relative to the piston is restricted in part by a snap ring 35 on the end of the poppet above the piston. The latter will be seen also to comprise a top flange 36 defining a recess which is deeper than the terminal extent of the poppet above the snap ring, an outer peripheral shoulder 37, and ports 38 for flow of fluid from one side of the piston to the other.

A pressure-regulating spring 29 is disposed about the poppet between the underside of the piston 33 and the collar 32 and will be seen to be caged by the snap ring 35, with a predetermined preload. A small bypass spring 40 is disposed between the underside of the piston and the step 41 at the bottom of the piston-receiving recess section 26, and a bimetallic disc 42 which is normally concave as shown in FIG. 2 at relatively cold temperatures is seated in the upper recess section bearing, in such concave condition, at its inner edge against the piston shoulder 37.

Figure 2:
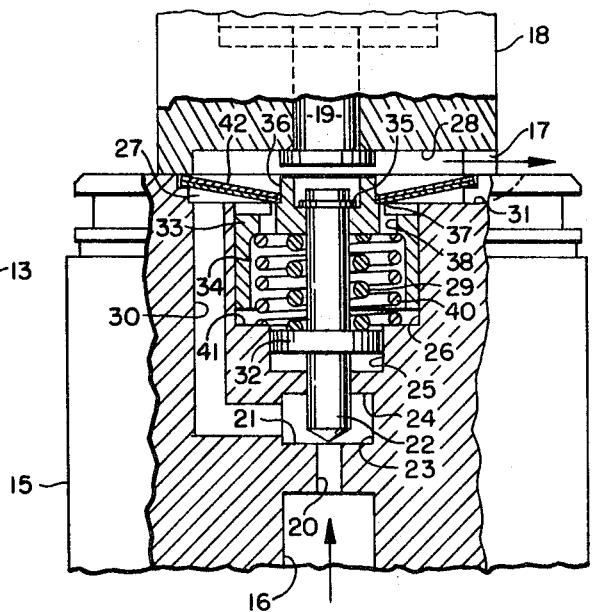
FIG. 2 is a transverse section of the new valve in its heating mode of operation.

In this FIG. 2 condition, noted earlier as providing the heating mode of the valve operation, the bimetallic disc 42 exerts a spring load on the piston and accordingly loads the poppet against the valve seat 21. The solenoid plunger 19 is retracted, with such poppet loading only through the disc and regulating spring 29 and determining fluid pressure flow at a predetermined rate as indicated by the arrows and the partial withdrawal of the poppet from the seat.

Figure 3:
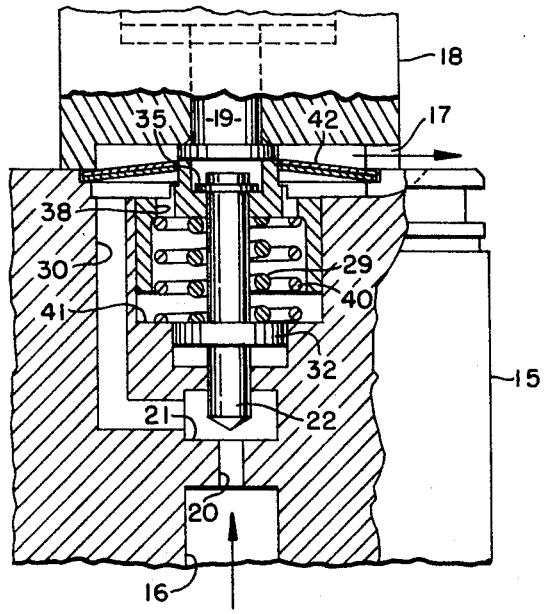
FIG. 3 is a comparable view of the valve in the bypass mode.
Figure 5:
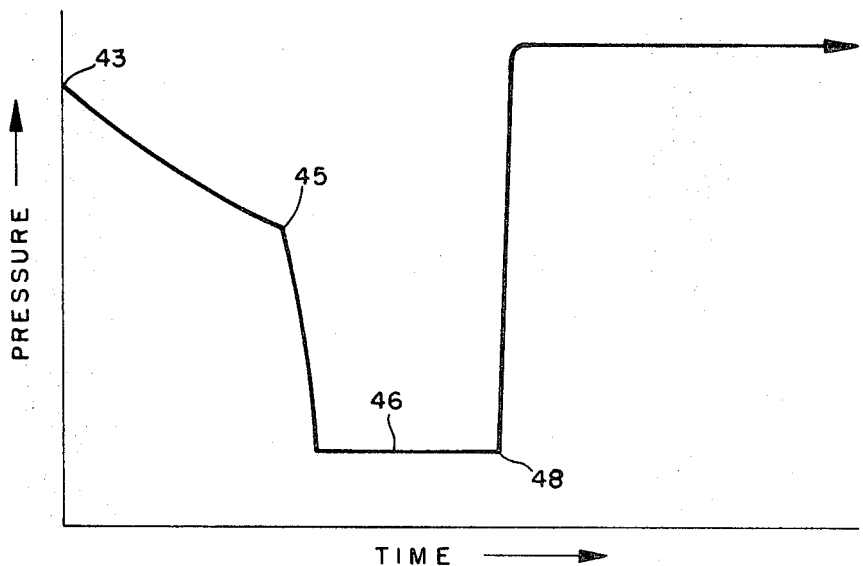
FIG. 5 is a graph generally showing the system pressure characteristic.
Figure 6:
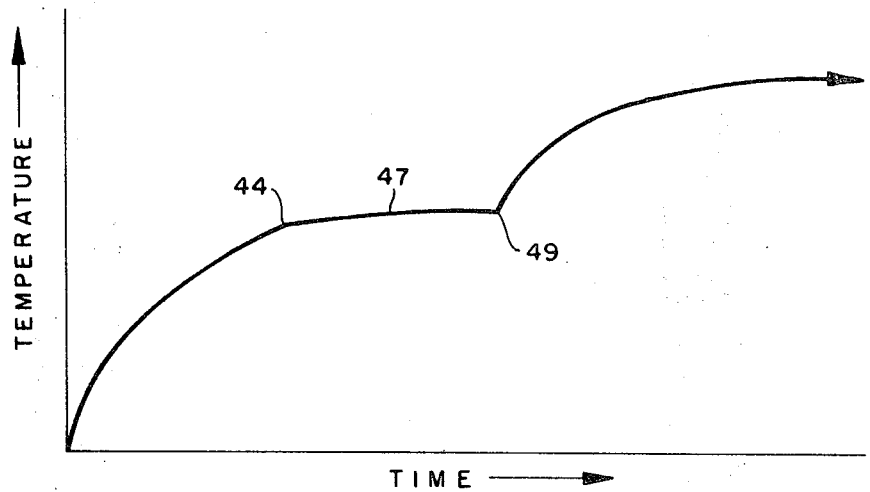
FIG. 6 is a chart showing generally the system temperature characteristic.

The drop in fluid pressure across the valve in this condition converts the mechanical energy to thermal energy to warm the fluid and, at a predetermined relatively elevated temperature, the flow of the same over the disc causes the latter to invert to the convex form shown in FIG. 3. Assuming that the system temperature is below this disc inversion value, and the heating mode thereby operative, the charts of FIGS. 5 and 6 show that the pressure starting from the reference point 43, determined by the setting of the disc load, drops gradually while the temperature rises to the inversion point 44, corresponding to the pressure at point 45. The snapping of the disc then automatically places the valve in the bypass mode.

When the disc does invert, it snaps fully clear of the piston and has no further control function in the normal bypass and relief modes. In the FIG. 3 illustrated bypass mode, with the solenoid plunger still retracted, both the poppet and piston are free to move upwardly sufficient fully to withdraw the former from the valve seat under the fluid pressure, so that the valve provides free bypass of fluid with minimum restriction. The small bypass spring 40 is sufficient to keep the piston poppet assembly away from the seat should vibrational and gravitational forces be applied in the closing direction. The system is thus in standby condition with the pressure and therefore the power input at a minimum and the temperature maintained at a satisfactory level as indicated by the pressure and temperature graph portions 46 and 47, respectively, in FIGS. 5 and 6.

Figure 4:
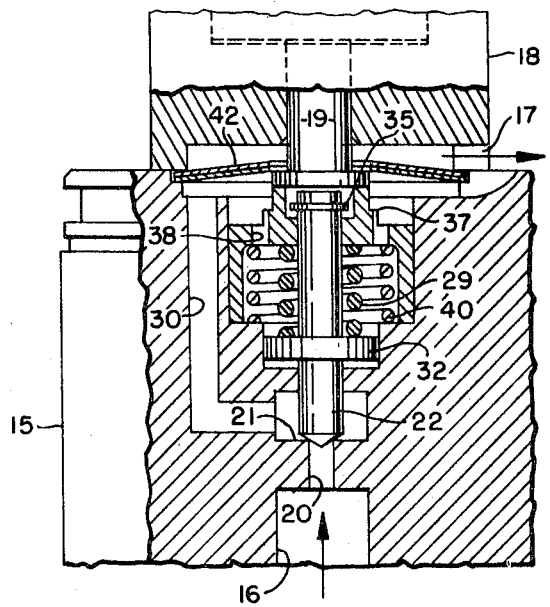
FIG. 4 shows the valve actuated to its relief condition or mode.

When fluid pressure is required in the system for control of the actuator, solenoid 18 is operated by a suitable electrical signal to extend (depress) the plunger 19 and place the valve in the relief mode shown in FIG. 4. In this condition, the solenoid plunger engages the top flange 36 of the piston and forces it down until it bottoms by abutment of the skirt 34 with the body shoulder or step 41. The poppet snap ring 35 lifts slightly off the piston, and the poppet acts as a conventional damped pressure-regulating valve directly operating on the spring 29.

Referring again to FIGS. 5 and 6, the points 48 and 49 therein indicate the solenoid energization and show the pressure rising to the regulated level accompanied by a further rise and leveling of the temperature of the system.

The new valve thus, basically, provides bypass and relief modes with a single valve-seating member, with a regulating spring which is caged on a poppet in the first such mode and uncaged by an actuation signal in the second mode to hold the poppet against the seat with the proper force for the desired relief. The added temperature responsiveness of the assembly is not critical to realization of the noted basic functions, but is of course an obviously advantageous addition in any environment in which cold-impaired performance might occur and be undesirable.

Other modes of applying the principle of the invention may be employed, change being made as regards the details described provided the features stated in any of the following claims or the equivalent of such be employed.

We, therefore, particularly point out and distinctly claim as our invention:

We claim:

1. A combination bypass and relief valve, comprising a valve seat to which pressure fluid is delivered in use of the valve, a poppet cooperating with said seat to regulate the pressure and flow of such fluid through the valve, pressure-regulating spring means for loading said poppet against said seat, and controlled means having two conditions of adjustment for variably applying the force of said spring means to such loading of the poppet, said controlled means in one condition of adjustment drivingly coupling the spring means and poppet in seat closing direction with predetermined loading of the latter to provide a pressure relief-operating mode, and the controlled means in its other adjusted condition relatively disabling the spring means so that the poppet loading is substantially eliminated, and additional spring means for maintaining said poppet away from said seat when said controlled means is in such other adjusted position to permit free flow of the fluid through the valve in a bypass mode of operation.

2. A valve as set forth in claim 1, including solenoid means for actuating said controlled means between its such conditions of adjustment.

3. A combination bypass and relief valve, comprising a valve seat to which pressure fluid is delivered in use of the valve, a poppet cooperating with said seat to regulate the pressure and flow of such fluid through the valve, pressure-regulating spring means for loading said poppet against said seat, and controlled means having two conditions of adjustment for variably applying the force of said spring means to such loading of the poppet, said controlled means in one condition of adjustment drivingly coupling the spring means and poppet in seat closing direction with predetermined loading of the latter to provide a pressure relief-operating mode, and the controlled means in its other adjusted condition relatively disabling the spring means so that the poppet loading is reduced to a level permitting free flow of the fluid through the valve in a bypass mode of operation, said controlled means including temperature responsive means for automatically applying an intermediate load to the poppet which permits a restricted heating flow of the fluid when below a predetermined temperature.

4. A combination bypass and relief valve, comprising a valve seat to which pressure fluid is delivered in use of the valve, a poppet cooperating with said seat to regulate the pressure and flow of such fluid through the valve, pressure-regulating spring means for loading said poppet against said seat, and controlled means having two conditions of adjustment for variably applying the force of said spring means to such loading of the poppet, said controlled means in one condition of adjustment drivingly coupling the spring means and poppet in seat closing direction with predetermined loading of the latter to provide a pressure relief-operating mode, and the controlled means in its other adjusted condition relatively disabling the spring means so that the poppet loading is reduced to a level permitting free flow of the fluid through the valve in a bypass mode of operation, said controlled means including a member cooperating with the poppet to contain the pressure-regulating spring means, the poppet being movable with said member in the valve seat opening direction in said other adjusted condition of the controlled means, and the member being moved relative to the poppet against the spring means to compress the same in said one condition of adjustment.

5. A valve as set forth in claim 4, including bypass spring means for resiliently urging said member in the seat opening direction in said other condition of adjustment determining the bypass-operating mode of the valve.

6. A valve as set forth in claim 5, including solenoid means for so moving the member relative to the poppet to establish the relief-operating mode of the valve.

7. A valve as set forth in claim 6, including temperature responsive means for automatically applying an intermediate load to the poppet which permits a restricted heating flow of the fluid when below a predetermined temperature.

8. A valve as set forth in claim 7, wherein the temperature responsive means comprises a snap-acting bimetallic device.

9. A valve as set forth in claim 4, wherein said member comprises a piston axially movable toward and away from said valve seat, said piston having a top flange portion defining a recess therein, said poppet slidably extending through said piston into said recess, a snap ring on said piston within said recess for limiting axial movement of said poppet away from said piston by said spring means to retain said poppet out of engagement with said valve seat when said piston is in said other adjusted condition of the controlled means.

10. A valve as set forth in claim 9, wherein said piston has a depending skirt portion which limits movement of said piston toward said valve seat in said one condition of adjustment, said poppet being free to be moved into engagement with said valve seat by said spring means when said piston is in said one condition of adjustment.

11. A valve as set forth in claim 9, wherein said recess is deeper than the terminal extend of said poppet above said snap ring, and solenoid means are provided for engaging said top flange portion of said piston to move said piston to said one condition of adjustment.

12. In a pressure fluid system valve having a seat and cooperable poppet, means supporting the poppet normally for movement freely away from the seat by the pressure fluid to provide substantially unrestricted flow through the valve, said means including vibration-absorbing spring means resiliently urging said poppet away from said seat, and temperature responsive means for applying a closing force on the poppet which is greater than the force exerted by said spring means when the fluid temperature is below a predetermined value and to relieve such force when the fluid is at or above such temperature.

13. A valve as set forth in claim 12, wherein the temperature responsive means comprises a bimetal actuator subjected to the fluid flow.

14. A valve as set forth in claim 13, wherein said bimetal actuator is snap-acting.